Figure 1:
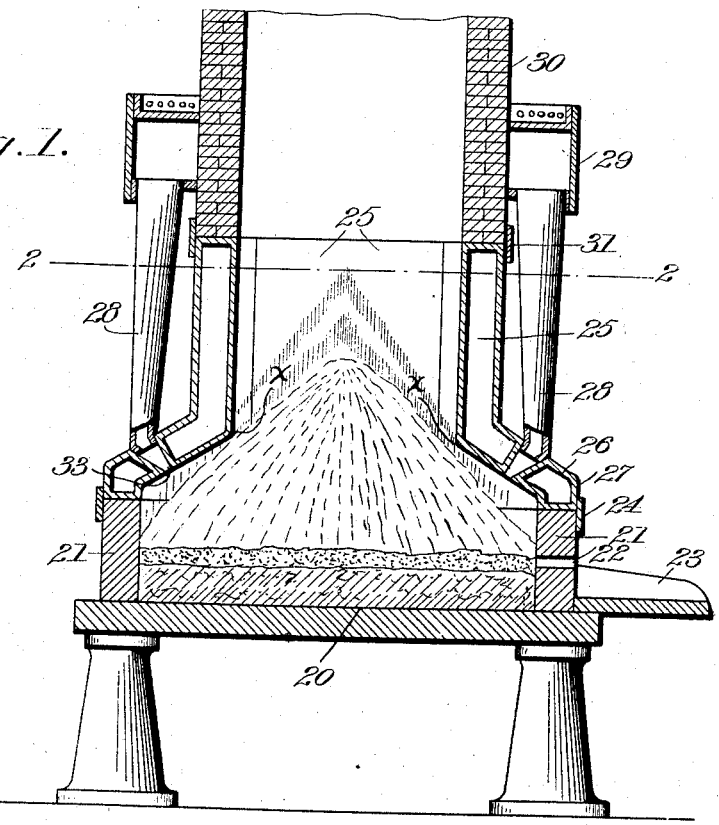

No. 846,498. PATENTED MAR. 12, 1907.
C. W. MUNSON.
PROCESS OF SMELTING SULFID ORES.
APPLICATION FILED MAR. 23, 1906.

3 SHEETS—SHEET 1.

Witnesses
Inventor
C. W. Munson
By A. W. Harrison
Attorney

No. 846,498. PATENTED MAR. 12, 1907.
C. W. MUNSON.
PROCESS OF SMELTING SULFID ORES.
APPLICATION FILED MAR. 23, 1906.
3 SHEETS—SHEET 2.
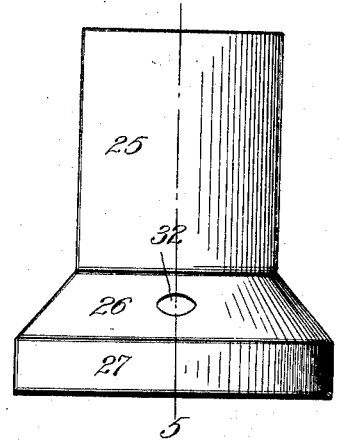
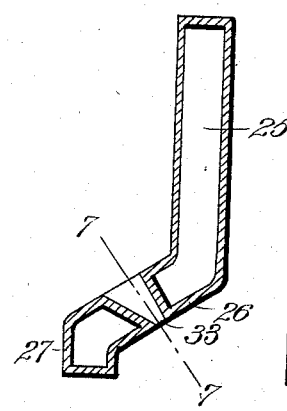
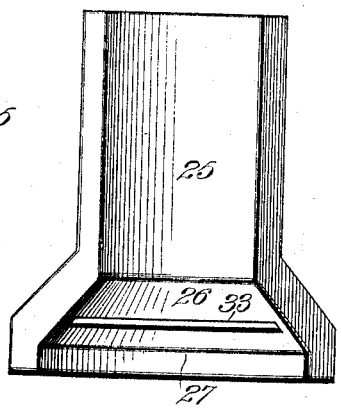
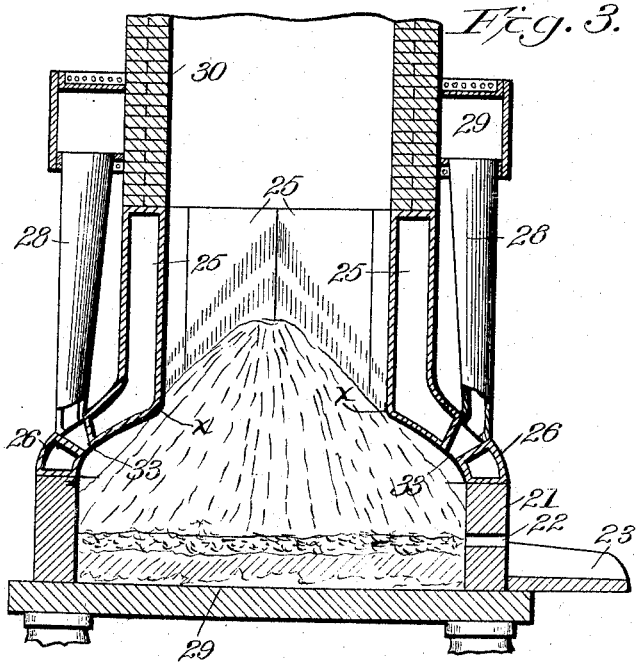
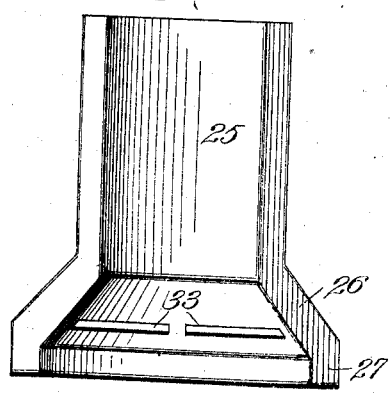
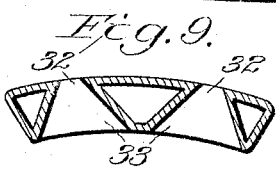

No. 846,498. PATENTED MAR. 12, 1907.
C. W. MUNSON.
PROCESS OF SMELTING SULFID ORES.
APPLICATION FILED MAR. 23, 1906.
3 SHEETS—SHEET 3.
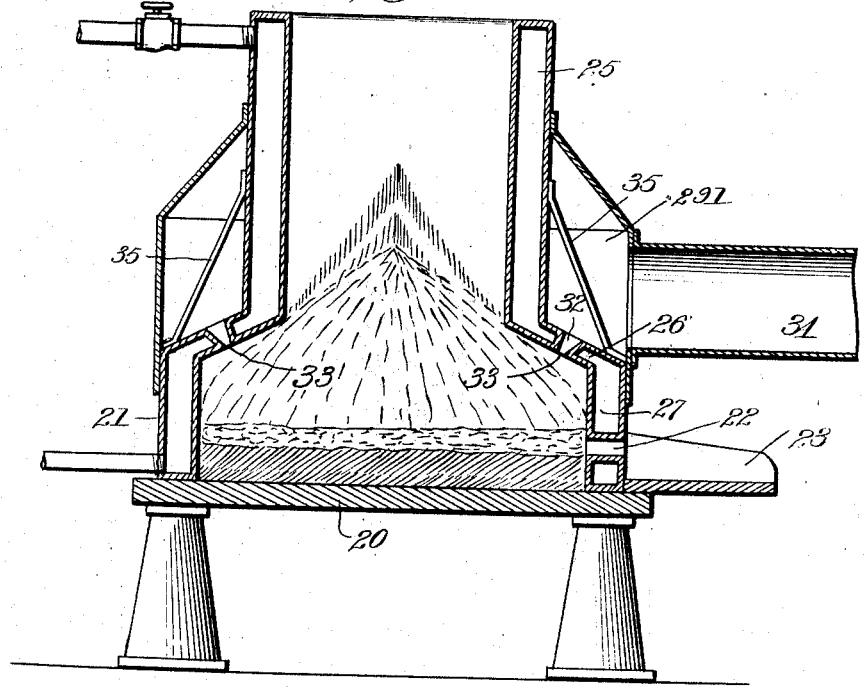
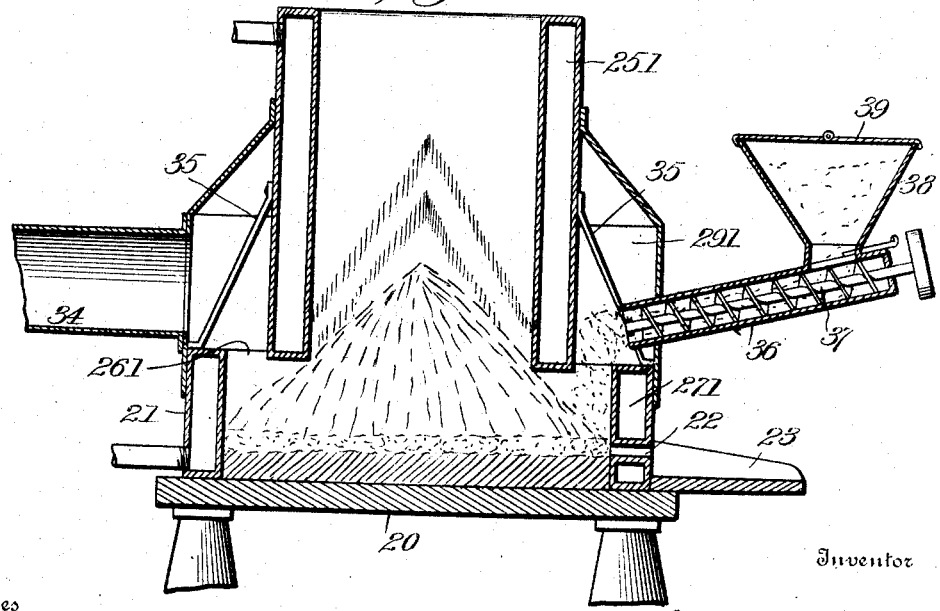

UNITED STATES PATENT OFFICE.

CORYDON W. MUNSON, OF TOLEDO, OHIO.

PROCESS OF SMELTING SULFID ORES.

No. 846,498.   Specification of Letters Patent.   Patented March 12, 1907.

Application filed March 23, 1906. Serial No. 307,686.

*To all whom it may concern:*

Be it known that I, CORYDON W. MUNSON, a citizen of the United States, residing at Toledo, in the county of Lucas and State of Ohio, have invented new and useful Improvements in Processes of Smelting Sulfid Ores, of which the following is a specification.

My invention relates to the smelting of pyrites or sulfid ores or artificial sulfites carrying gold, silver, copper, or other metal values, the purpose and object being to utilize the fuel elements of sulfur and iron in the ores to furnish the heat to smelt themselves with the use of but little or no extraneous fuel.

The usual method of smelting practice is a reducing or melting down of the ores; but it is well known that the hot-blast smelting of sulfid ores is an oxidizing process, where a large volume of heated air is driven into the ore body in the furnace under pressure, producing a rapid oxidation of the sulfur in the ores, and an intense heat is developed and maintained by releasing the sulfurous gases as the ores are melted and driven into the ore body, these gases combining with the heated oxygen of the air-blast.

The usual practice is to drive the air-blast into the ore body in the furnace through separate round openings or twyers, resulting in an unequal oxidation. The blast penetrating the ore mass in the fusing zone at separate and individual locations tends to produce accretions at and around the twyer-openings, which interfere with the uniform distribution of the air-blast through the ore mass, thus lessening the efficiency of the furnace.

My improved method of supplying the hot blast by which said blast is delivered into a confined circular air-space or annular chamber which circles the entire body of ore on the furnace-hearth results in distributing the air evenly and against the exposed surface of the ore body instead of driving the air into the ore at separate twyer-openings. Therefore by this improved method the air penetrates the ore mass uniformly at all points and under uniform pressure over the entire surface. An improved form of furnace by which I secure these results is of special construction and is shown and claimed in another application for patent filed by me November 6, 1905, Serial No. 286,009.

One of the objects of this invention is to improve the method of smelting referred to by confining the hot blast so that it is not free to pass over the surface of the ore pile, but is held confined in the space into which it is driven, so that it will be forced under pressure into the ore body, such pressure or forcing of the air into the ore body or charge being uniformly distributed and not directed against or into the ore in separated locations.

Another object of the invention is to protect the twyers from the molten mass by preventing the spreading of the charge.

Another object of the invention is to form a limited air-space around the ore charge or heap and to drive the hot blast into said space to drive back into the mass of ore the gases which result from the smelting of the surface portions of the charge.

To these ends the invention consists in the method substantially as hereinafter described and claimed.

In the accompanying drawings I have illustrated a suitable apparatus for carrying out the process claimed herein, said apparatus, however, forming the subject-matter of the application above referred to.

Figure 2:
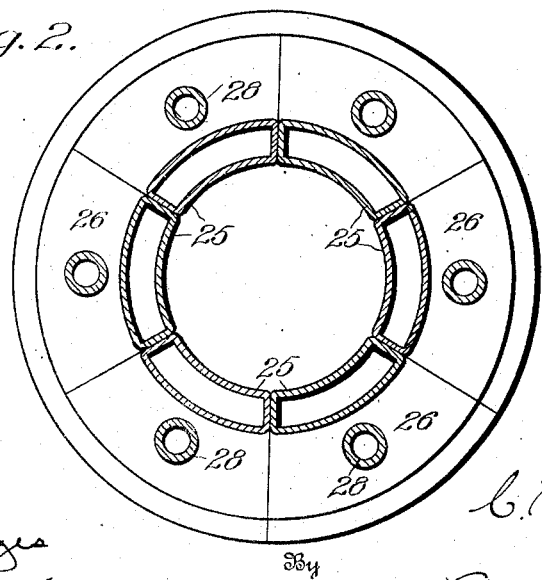

In said drawings, Figure 1 is a vertical sectional vew of a furnace which may be employed in carrying out my improved method. Fig. 2 represents a section on line 2 2 of Fig. 1. Fig. 3 is a view similar to Fig. 1, showing a slightly-different form of the shoulder portions of the sections and also indicating a different height at which the ore body or charge may be maintained during the smelting process. Fig. 4 is a detail outside elevation of one of the interchangeable water-jacketed sections of the furnace, said section having a single twyer integral with said section. Fig. 5 represents a section on line 5 5, Fig. 4. Fig. 6 is a detail inside elevation of the section shown in Figs. 4 and 5. Fig. 7 represents a section on line 7 7 of Fig. 5. Figs. 8 and 9 are views similar to Figs. 6 and 7, but illustrating a plurality of twyers in the section. Figs. 10 and 11 are views similar to Fig. 1, but illustrating modified forms of apparatus which may be employed in carrying out my improved process.

Similar reference characters indicate the same or similar parts on all of the figures of the drawings.

It is well known that smelting-furnaces are now built with walls of sectional construction, each section having one or more twyers; but so far as I am aware the walls of such furnaces are vertical or inclined inward at the hearth-section.

The feature of novelty in connection with my improved sectional furnace is the shape of the sections by which an enlarged hearth is secured and with twyers located in those portions of the sections which form the flaring portion of the furnace-wall.

A suitably-supported hearth is represented at 20, its wall 21 being formed with a discharge-hole 22, through which the molten product passes to the spout 23 for tapping it off. This hearth-section forms no part of my present invention and may be constructed in any well-known or preferred manner. Its shape in plan may be round or elongated, as hereinafter described. The vertical portion of the hearth-section represented by 21 may, however, be formed by extending downward the lower vertical part of the water-jacketed metallic portions of the furnace-wall far enough to form the hearth-section.

The metallic portion of the furnace is supported on the wall and is composed of a plurality of removable sections, each of which is hollow to form a water-jacket. Connections for supplying the sections with water are not shown, as they may be any form, such as commonly employed with water-jacketed furnaces. The sections may be secured together and to the wall 21 by suitable means, such as a band, (indicated at 24 in Fig. 1.)

Each water-jacketed section, when constructed as shown in Figs. 1, 2, 4, 5, 6, and 7, comprises an upper portion 25 and a lower portion 26 at an obtuse or other suitable angle thereto, so that when six of such sections are assembled, as in Figs. 1 and 2, the lower portion of the chamber inclosed by said sections flares or spreads outwardly, thus giving an enlarged hearth area with inwardly-sloping upper walls at such an angle that when ore is piled on the hearth even to a height that will reach the angle $x$ where the portions 25 and 26 meet the natural incline of fall of the sides of the pile or heap of ore will not reach the inner surface of said sloping walls. Preferably each section is formed with a lower edge portion 27 to rest on the side 21 of the hearth-section, which portion 27 is parallel with the portion 25, although offset therefrom by the intervening inclined or flaring portion 26, or this part 27 of the section may be extended downward to form the hearth-section 21, as above mentioned. Said inclined or flaring portion is formed with a twyer-opening (or a plurality of such openings, as in Figs. 8 and 9) to receive the air-blast through tubes or nozzles 28 from a suitable source of supply of heated air, such as a hot-air box 29, surrounding the brick part 30 of the furnace resting on the metallic sections. The supply of hot air at the proper temperature may be obtained by means of any suitable apparatus.

If desired, an inclosing band 31 may surround the joint between the upper ends of the metallic sections and brickwork, which band may of course be of any height, even to forming a complete jacket for the brickwork.

The outer end of each twyer is preferably round, as at 32, for the connection of the tube 28, and the walls converge vertically (see Fig. 5) and diverge horizontally to the inner end 33, (see Figs. 6, 7, 8, and 9,) so that the blast of heated air is in a practically continuous thin stream entirely around the furnace. However, twyers round at both ends may be used, if desired.

Instead of making the shoulder portion 26 of the water-jacketed sections in the form of straight inclines they may be more or less concave internally, as indicated in Fig. 3. In other words, the outward and downward flare of these portions 26 may be either as straight or curved inclines; but it is essential that the flare or incline from the angle $x$ shall be greater relatively to the vertical than the natural incline of fall of the sides of the ore body, so that when said body is fused and kept supplied with fresh charges there will always be preserved an air-space between the surface of the fusing mass and the mouth of the twyers, whether the hearth be supplied with ore to a point below the angle $x$ or even to a point above it, as indicated in Fig. 3. If the ores are loaded up into the neck of the furnace above the angle $x$ and the blast driven into the air-space just inside the twyers, said blast being continuous and encircling the entire ore body, the effect of such blast is to penetrate the surface of the ore body evenly and to be distributed uniformly and carry down the values into the matte or slag, saving a much higher percentage than can be done when there is any deflection of the blast upward or when penetrating the ore body at separate points from the usual form of round twyers spaced apart. With the air-space so confined and encircling the ore body or charge the formation of the twyers with widened or laterally-elongated inner ends is not indispensable, as the contracted neck of the furnace so confines the air that it is evenly distributed in said space under substantially uniform pressure at all points around the inclined sides of the charge; but I prefer to employ twyers of the form shown and described for several reasons, one being that their widened inner ends cause the blast to effect a more even penetration of the surface upon which it impinges and more uniformly reduce the ore and carry the values down into the matte or slag.

The supply of ore may be given to the furnace by any suitable means or through any suitable opening at the top of the furnace, (not shown,) an initial charge being made, and successive small quantities supplied at short intervals.

If the height of the charge is such that its sides do not reach the neck x, as indicated in Fig. 1, the blast of air and the fusing zone of flame is confined by the inclined surface 26 above the mouths 33 of the twyers, so that the mantle of flame approximately follows the inclined sides of the charge or heap and results in greater efficiency than if such blast was blown into a body of ore, covering the twyer-opening, as is done in usual practice. In this case the special or elongated form of twyer described is of great utility, since the entire set of twyers causes a practically continuous blast around the charge or heap to penetrate the surface and carry down the values.

A special advantage of the preservation of the confined air-space adjacent the twyers is that said twyers are protected from the ore clogging them or the molten mass, which will always flow below them, there being therefore no liability of any of said twyers being clogged or of any of the molten mass running into them, a condition which is a source of much trouble under present practice.

In Fig. 10 I have illustrated another form of furnace which may be employed in carrying out my improved process. In said figure the walls of the furnace are composed of one circular section water-jacketed from top to bottom and with the hot-air box 291, surrounding the furnace in a lower plane than in Fig. 1, so as to communicate directly with the ore without the intervention of twyers. Leading to said hot-air box 291 is an air-pipe 34 for conveying a hot-air blast to the box 291. Within the box 291 there may be suitable braces 35 to better support the weight of the upper portions of the water-jacketed section.

In Fig. 11 I have represented a furnace differing somewhat from that shown in Figs. 1, 3, and 10 and also having means for carrying out a further step of my invention. In said Fig. 11 the furnace-walls are shown as in two entirely-separated water-jacketed portions 251 and 271 with a clear annular space 261 between them, therefore dispensing with twyers. The lower edge of the upper portion 251 serves to prevent the spread of the ore in the same manner as the neck or angle x in the other figures, and the annular air-space for the blast under pressure is confined to the space within the hot-air box 291 and below said lower edge of the wall portion 251. In said Fig. 11 a tubular chute 36 leads into one side of the box 291 and contains a screw conveyer 37, operated by any suitable means. A hopper 38 connects with the outer portion of the chute and is provided with a cover adapted to be tightly closed after it has been filled with concentrates. Instead of briqueting fines and concentrates before smelting, so as to feed in with the ore at the top of the furnace, the same may be placed in the hopper 38 and the cover closed and the screw conveyer 37 operated to force the concentrates into the box or chamber 291, where they will be taken up by the hot-air blast and forced into the fusing zone encircling the heap of ore.

As the fines and concentrates thus forced into the confined air-space around the heap carry a high percentage of sulfur and iron, they are fused at once, releasing the sulfurous gases into the air-chamber, and are oxidized by the air from the hot blast and driven into the melting ore in the fusing zone, thus utilizing to the greatest efficiency the heat units developed from the fuel elements of sulfur and iron contained in the sulfid ores fed to the furnace and producing an intense heat in the fusing zone of the furnace and a rapid smelting of the ores.

Carbonaceous fuel, such as powdered coke or charcoal or other forms of fuel, may be fed and driven into the confined air-space with the fines or concentrates or by itself, so as to increase the temperature of the fusing zone. Such fuel cannot escape before doing its work, because there is no opportunity for its immediate escape from the confined air-space.

While I have for convenience shown the feed-chute as opposite the air-pipe 34, it is to be understood that they may be closely adjacent to each other, or the feed of the concentrates might be into the air-pipe, so that said concentrates would be blown in with the air instead of being taken up by the air in the box 291. In either case the concentrates go directly to the surface of the melting ore on the hearth.

Having now described my invention, I claim—

1. The process of smelting sulfid ores, which consists in forming and maintaining a heap of the ore with inclined sides from the base upward, forming a limited and confined air-space around the base of the heap, and forcing a heated air-blast into said space.

2. The process of smelting sulfid ores, which consists in forming and maintaining a low charge with inclined sides from the base upward, preventing the spread of the charge at a point above its base and maintaining an air-space surrounding the said inclined sides including the base thereof, and forcing air into said space and upon said inclined sides.

3. The process of smelting sulfid ores, which consists in forming and maintaining a heap of the ore with inclined sides from the base upward, heating the heap to a temperature sufficient to enable a portion of the sulfur therein to be released and to combine with oxygen, forcing air upon the exposed sides of the heap including the base thereof, thereby effecting combustion of a portion of the sulfur and enveloping the heap in a mantle of flame and fusing the outer portion of the heap, and confining the fusing zone of flame to the approximate inclined sides of the heap, within the confined air-space.

4. The process of smelting sulfid ores, which consists in forming and maintaining a confined air-space between the walls of a furnace and the sides of a low ore charge around the base thereof, and forcing a hot-air blast into said space.

5. The process of smelting sulfid ores, which consists in forming and maintaining a confined air-space between the walls of a furnace and the sides of a low ore charge around the base thereof, and uniformly distributing hot air under pressure in said space to drive back into the mass on the furnace-hearth the gases resulting from the melting of the sulfur in portions of such charge.

6. The process of smelting sulfid ores which consists in forming and maintaining a low charge of the ore with inclined sides, forcing a heated air-blast against the surface of said charge around the base thereof, and preventing the direct passage of the air upward over the said surface of the charge.

7. The process of smelting sulfid ores, which consists in forming and maintaining a heap of the ore with inclined sides from the base upward, forming an upwardly-converging confined air-space surrounding the base of the heap, and forcing a heated air-blast into said space.

8. The process of smelting sulfid ores which consists in forming and maintaining a heap of the ore with inclined sides from the base upward, forcing a heated air-blast against the surface of the heap adjacent to its base, and preventing the spread of the ore above that part of the surface into which the blast is driven.

9. The process of smelting sulfid ores, which consists in forming and maintaining a heap of the ore with inclined sides from the base upward, forming a limited and confined air-space around the base of the heap, forcing a heated air-blast into said space and simultaneously feeding fuel to said space.

10. The process of smelting sulfid ores, which consists in forming and maintaining a heap of the ore with inclined sides, forming a limited and confined air-space around the heap, forcing a heated air-blast into said space and simultaneously feeding fines and concentrates to said space.

In testimony whereof I have affixed my signature in presence of two subscribing witnesses.

CORYDON W. MUNSON.

Witnesses:
G. E. KEYT,
DOROTHY O. GARWOOD.